Figure 1:
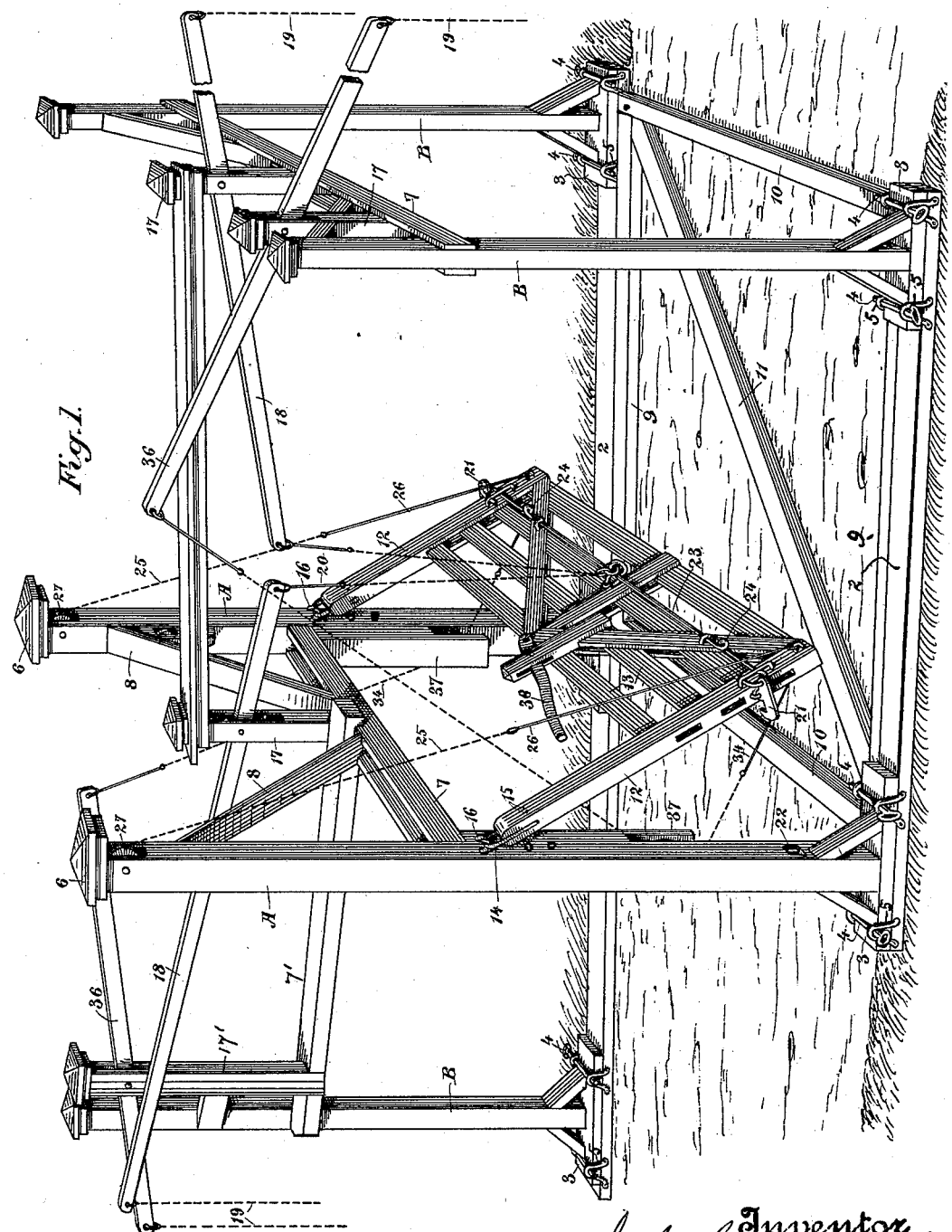

No. 671,582. Patented Apr. 9, 1901.
J. G. BUSCH.
GATE.
(Application filed July 2, 1900.)
(No Model.) 2 Sheets—Sheet 1.

No. 671,582. Patented Apr. 9, 1901.
J. G. BUSCH.
GATE.
(Application filed July 2, 1900.)
(No Model.) 2 Sheets—Sheet 2.
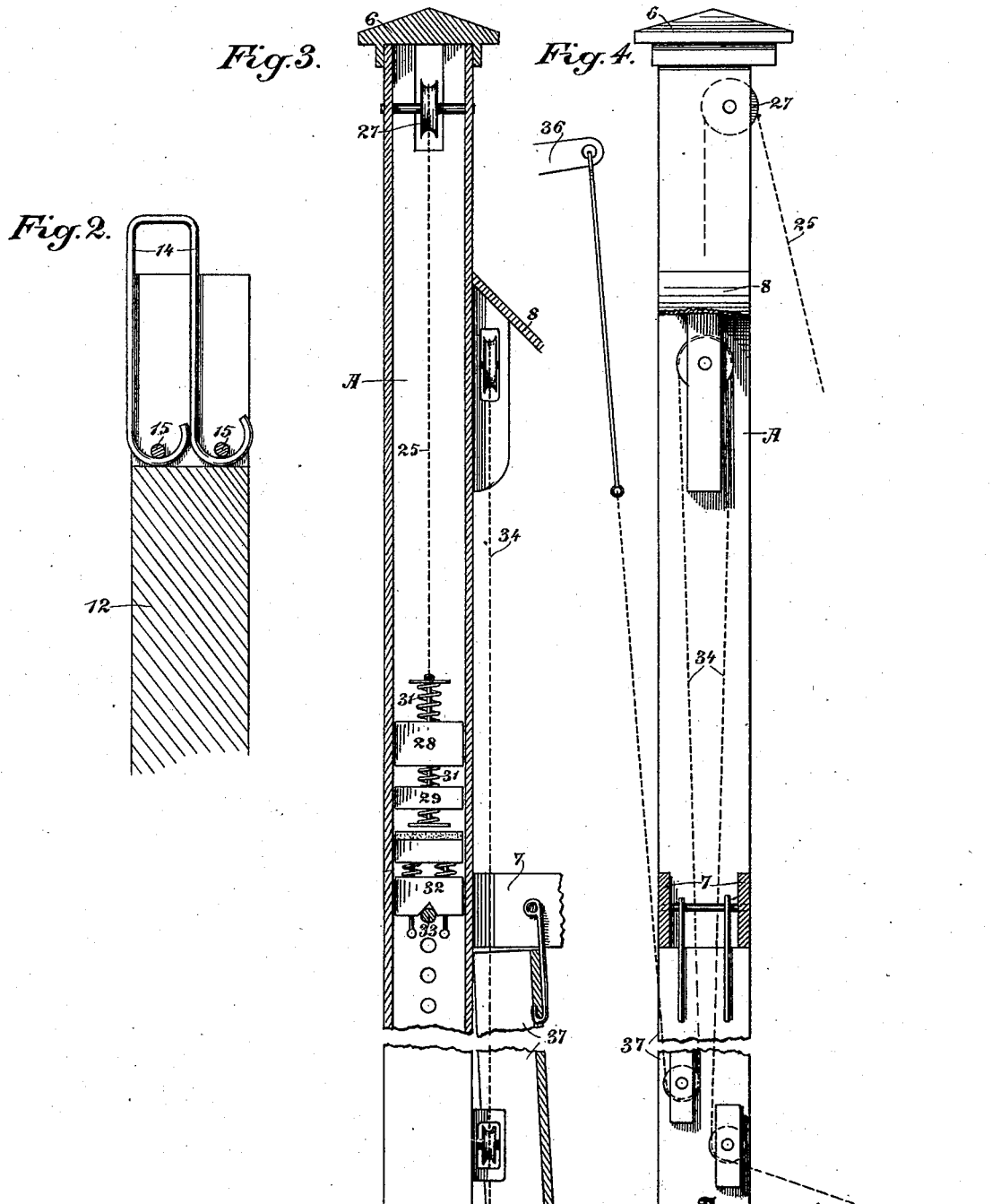

UNITED STATES PATENT OFFICE.

JOHN G. BUSCH, OF POTTER VALLEY, CALIFORNIA.

GATE.

SPECIFICATION forming part of Letters Patent No. 671,582, dated April 9, 1901.

Application filed July 2, 1900. Serial No. 22,292. (No model.)

*To all whom it may concern:*

Be it known that I, JOHN G. BUSCH, a citizen of the United States, residing at Potter Valley, county of Mendocino, State of California, have invented an Improvement in Gates; and I hereby declare the following to be a full, clear, and exact description of the same.

My invention relates to gates; and it consists of the parts and the constructions and combinations of parts hereinafter described and claimed.

Figure 1 is a general view of the gate. Fig. 2 is a detail section of the upper part of the gate, showing the manner of hinging it. Fig. 3 is a vertical section through one of the gate-posts. Fig. 4 is an outside view of the side contiguous to one shown in the previous figure.

A A represent the main posts of the gate, and B represents supplemental posts situated at a distance upon each side of the gate, with connections by which actuating-levers are supported at a sufficient distance from the gate to enable those riding toward the gate from either side to operate the mechanism by which the gate is opened, so that they can pass, and afterward to close the gate by a similar operation. These posts may be set in any well-known or usual manner; but on account of the softening of the ground by rains and the action of frost I have found it preferable to form a base consisting of parallel side timbers 2, upon which the bases of the posts are set, these timbers being either laid directly upon the ground or supported upon brick or other foundation work, as may be desired. The bases of the posts A and B are mortised into or otherwise secured to short horizontal plates 3, which are suitably braced to them. These rest upon the timbers 2 and are secured by means of pins 4, which pass through loops 5, secured to the base-timbers 2, and projecting upward sufficiently to receive these locking-pins. The uprights are thus removably secured to the sills 2 and can be conveniently adjusted and regulated at any time. The posts A are made hollow to receive the counterbalance-weights, to be hereinafter described, and various directing-pulleys over which ropes pass. These parts A and B are all provided with removable roof-shaped caps 6, which are fitted upon them and can be taken off at will.

Transversely between the posts A extends the horizontal timber 7 at a sufficient height from the ground to allow any team or load of any height to pass beneath it.

8 represents flat strips of considerable width which extend from the upper part of the posts to the transverse timber 7 and act as braces and at the same time as covers to shelter pulleys and operating cords or ropes which extend up and down the inner faces of the posts A.

In order to maintain the sills 2 in a rectangular shape, so that the parts will not get out of alinement, I have shown a supplemental frame consisting of timbers 9, which are parallel to the timbers 2 and are united at the ends by transverse timbers 10, while a diagonally-disposed brace 11 holds these timbers in an exact rectangular form.

The gate includes end bars 12 and strips 13, extending transversely from one end bar to the other and secured in any suitable manner. The upper ends of the bars 12 are provided with hinges, which are formed of links of stout wire or rod bent, as shown at 14, and secured in the upper ends of the bars 12 by pins 15, which extend through the loops formed by bending the lower ends of the wire, as plainly shown in Fig. 2.

The hooks 16, by which the gate is hung, are secured to the posts A and pass through the upper ends of the loops 14, so that the gate swings easily about these hinges. These loops 14 are secured toward the outer part of the bars 12, so that as the gate hangs from the suspending-hooks the tendency will be to draw the bars toward the center. This acts to hold the gate together and also has a tendency to prevent its being moved about or swung endwise by the action of high winds.

A vertical post 17 is supported upon the cross-timber 7 midway between the main posts of the gate, and similar posts are supported upon cross-timbers between the posts B. (Shown at the right-hand side of Fig. 1.) These supporting-posts 17 are slotted, and the levers 18 are each fulcrumed in one of these posts. The levers are of sufficient length outwardly from their fulcrum-points and may have depending flexible cords 19, convenient to be reached by persons driving or riding, so that by a pull the outer end of the lever is depressed. The inner ends of these levers are connected with the gate by cords, as at 20. The connection between these cords and the gate is also made to operate the latches by which the gate is normally retained in a closed position.

The latches 21 are suitably hinged upon the outer faces of the end bars 12 of the gate, and the hook ends of these latches enter holes 22 in the post A and engage properly-disposed catches, so as to retain the gate in its closed position when it is down. Connected with the outer ends of these latches 21 are flexible rods 23, which extend through suitable guides or loops to the center of the gate, where they are connected with the pull-cords 20 of the levers 18. Suitable coils or stops 24 are made in the rods 23 and limit the movement of these rods. When the pull is made upon either of the levers 18, the action through the cords 20 is to pull the center or meeting ends of the latch-actuating rods 23 upwardly, and as the outer ends of the rods slide through the guides they pull upon the latches, and thus disengage the latter. A further pull upon the levers 18 causes the gate to swing upward about its hinge-points 16 to approximately horizontal position or high enough to allow the team or load to pass.

In order to cause the gate to move easily, it is counterbalanced by weights movable within the hollow posts A and connected by cords 25 and rigid rods 26 with the lower part of the gate at each side. The cords pass over pulleys 27 in the upper part of the posts A, these pulleys being sheltered and protected from the weather by the overhanging caps 6, previously mentioned. Within the post the cords 25 extend downwardly and are connected with a rod which carries weights 28 and 29. These weights may be of different degree, and between them are interposed the springs 31. Beneath these and at any suitable point is a bumper 32, which is supported upon a rod or bolt 33, extending through the post. This rod is adjustable by means of a series of holes through the post, so that it may be raised or depressed, and by its position it limits the movement of the gate, so that it can be opened more or less, as occasion requires. When the gate is released by the action of its latches and pulled upwardly by the levers, the counterbalance-weights within the post will be sufficient to cause it to swing up easily to its open position, the lowermost springs being first arrested by the bumper 32 and the others following, so that the gate comes easily and gradually to the point of rest when opened, the weights being gradually arrested by the action of the springs, and any noise which might result from sudden stoppage of the weights is prevented.

The means for closing the gates consist of cords and rods, as at 34, connected with the lower part of the gate, thence leading over pulleys, as at 37, and to the ends of levers 36, which are fulcrumed in suitable supports from the posts B. The support herein shown for one of the levers 36 consists of one of the posts 17, which is supported on the cross-timber 7 at the right of Fig. 1, while the support for the other lever 36 is a corresponding post 17', supported upon a timber 7, shown at the left of Fig. 1 as connecting the cross-timber between the posts A with a post B at the left-hand side of the gate. These levers 36 have depending cords similar to those shown at 19, so that by a pull upon the cord after the passenger or load has passed through the gate the action of the connecting cords and levers will pull the gate downward and cause it to close and latch.

The pulleys are all suitably protected from the weather by covers, such as those shown at 8 and 37, these being arranged in any suitable or desired manner for the purpose.

By this construction I have an easily-operated gate, which is not disturbed by ordinary obstructions or the actions of the rain or frost. Being suspended from rigidly-fixed posts, it is always maintained in its proper form, and as it swings upwardly from the ground there is nothing to prevent its easily opening and closing, all parts being well protected and the counterbalance-weights making it easy for any one to operate.

In order that a person approaching the gate on foot should be able to open the gate without recourse to the long levers previously described, I have shown a short lever 38, fulcrumed upon the center of the gate and connected by a rod or otherwise with the meeting ends of the latch-lever rods 23, so that the latches can be disengaged by this lever as well as by the pull upon the cords 20, thus allowing the foot-passenger to pass, and after passing a push upon the gate will cause it to swing into its locked position. If the foot-passenger approaches from the right, he will unlatch the gate, step aside, let the gate rise to about the passenger's height, and then pass through, at the same time taking hold of the gate before it gets beyond his reach and pulling it down to latch again. If the said passenger approaches from the left, he will unlatch the gate and keep hold of it as it swings upward until having gone through. Then, having still hold of the gate, he will push the same back and down again, being now on the other side of the gate.

Having thus described my invention, what I claim as new, and desire to secure by Letters Patent, is—

1. In a gate, the combination of posts, a gate hinged thereto so as to swing upwardly, fulcrumed levers and connections therefrom to the gate, latching devices between the gate and posts, and slide-rods on the gate for operating the latches said rods operated by the lever connections, and means for limiting the inward movement of the rods.

2. In a gate, the combination of posts, a counterbalanced gate hinged above so as to swing upwardly, levers fulcrumed between their ends and connections between the inner ends of the levers and the gate, a latching mechanism between the gate and posts, and latch-operating slide-rods on the gate operated by said connections and provided with means for limiting their inward movement.

3. The combination of main posts, a gate hinged thereto so as to swing upwardly, fulcrumed levers and connections from the inner ends thereof to the gate, pulleys on the posts and connections passing over the same and having weights connected with one end and having the opposite end connected with the gate, slide-rods mounted on the gate and operated by said lever connections, latches hinged to the end bars of the gate and connected with said rods, and catches in the main posts and adapted to engage said latches.

4. The combination with supporting-posts of a gate having its upper end hinged thereto to swing about its hinges, means for operating the gate, latches hinged to each side of the gate adapted to engage with catches upon the main posts, rods guided and slidable horizontally with relation to the gate having their outer ends connected with the latches, stops by which the inward movement of the rods is limited, supplemental posts and levers fulcrumed thereto, and cords connecting said levers with the inner ends of the latch-actuating rods whereby the latches are first disengaged, and the gate afterward caused to swing upwardly about its hinges.

5. The combination in a gate of main posts to which the upper ends of the gate are hinged to swing in a vertical plane, latches hinged to the gate adapted to engage catches in the main posts, horizontally-slidable guided rods extending from the latches to the center of gate, cords connected with the inner ends of said rods and fulcrumed levers with which the opposite ends of the cords are connected whereby the latches are disengaged, and counterbalance-weights with cords connecting said weights with the gate and direction-pulleys over which the cords pass.

6. The combination in a gate of main posts to which the upper ends of the gate are hinged, cords connecting with the gate and with levers whereby the gate may be opened or closed, direction-pulleys over which the cords pass, counterbalance-weights suspended by cords within the gate-posts and direction-pulleys over which the suspending-cords lead to the gate, said counterbalances consisting of separate weights slidable upon a supporting-rod and having springs interposed between them, and a buffer or stop upon which the weights are arrested when the gate has been opened.

7. The combination in a gate of main posts to which the upper end of the gate is hinged, fulcrumed levers and cords connecting them with the gate whereby the latter may be opened or closed, counterbalance-weights movable within the main posts with cords connecting them with the gate, said weights being made in sections, a rod upon which said sections are slidable, springs or buffers interposed between the weights and a stop upon which the weights rest when the gate has been opened said stop being movable vertically upon the post to regulate the amount of opening of the gate.

8. The combination in a gate of sills parallel with and upon the sides of the roadway, vertical main posts with base-plates, and loops and pins by which they are removably fixed to the sills, a gate, the upper ends of the end bars of which are hinged to the main posts, latches upon each end of the gate, and catches on the posts with which they engage, horizontally-slidable guided rods connecting with the latches, and stops to limit their movement, fulcrumed levers and cords connecting them with the inner ends of the latch-rods whereby a pull acts through the rods to disengage the latches and to subsequently swing the gate upwardly about its hinges, other fulcrumed levers and cords connecting them with the bottom of the gate whereby the latter may be closed, sectional counterbalance-weights with interposed springs movable within the main posts and an adjustable rest or support therefor, cords connecting said weights with the gate and direction-pulleys around which said cords lead.

In witness whereof I have hereunto set my hand.

JOHN G. BUSCH.

Witnesses:
S. H. NOURSE,
JESSIE C. BRODIE.